No. 648,700. Patented May 1, 1900.
E. W. MERSEREAU.
BOX FOR CONTAINING SPOOLS.
(Application filed Jan. 16, 1900.)
(No Model.)
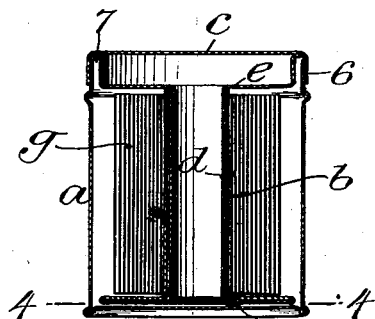
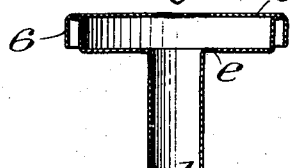
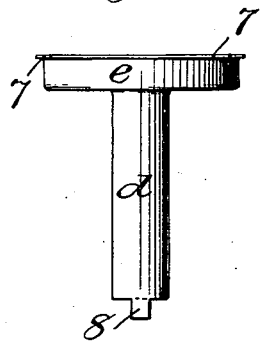
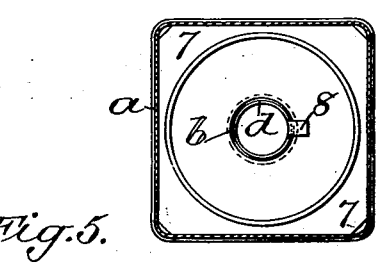
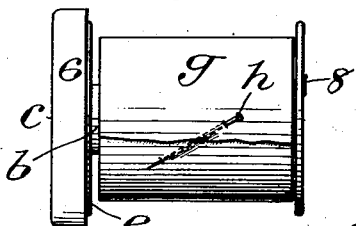
Witnesses:
George Barry Jr.
Edward Viesser
Inventor:
Edgar W. Mersereau
by attorneys
Brown & Seward

UNITED STATES PATENT OFFICE.

EDGAR W. MERSEREAU, OF NEW YORK, N. Y.

BOX FOR CONTAINING SPOOLS.

SPECIFICATION forming part of Letters Patent No. 648,700, dated May 1, 1900.

Application filed January 16, 1900. Serial No. 1,597. (No model.)

*To all whom it may concern:*

Be it known that I, EDGAR W. MERSEREAU, a citizen of the United States, and a resident of the borough of Brooklyn, in the city of New York and State of New York, have invented a new and useful Improvement in Boxes for Containing Spools, of which the following is a specification.

The object of my invention is to provide a box for containing a spool and from which the spool may be withdrawn by the act of removing the lid from the box and, further, to provide for the convenient holding of the withdrawn spool while the material which has been wound upon it is unwound, such a box being especially applicable for containing the spools upon which ink-ribbons for typewriters are wound, because it permits the unwinding of such ribbons from their spools for placing them in the machine to be performed with less soiling of the fingers.

A box embodying my invention has a detachable or movable lid or cover to which is attached a spindle for the reception of the ribbon-spool.

The improvement consists in certain features hereinafter described and claimed in such a box.

Figure 1 represents a central section of a box and contained ribbon-spool embodying my invention. Fig. 2 is a sectional view corresponding with Fig. 1 of the box-cover and its attached spool-spindle; Fig. 3, a side view of the spool-spindle without the box-cover. Fig. 4 represents a cross-section of the box, taken just within its bottom in the line 4 4 of Fig. 1, showing the ends of the spindle and spool. Fig. 5 is a side view of the box-cover with its attached spindle and a spool of ribbon thereon.

*a* designates the body of the box, which may be of any form suitable for containing a spool *b*, but is represented square.

*c* is the box-cover, having a rim 6 overlapping and fitting to the exterior of the body.

*d* is the spool-spindle, attached at one end to the box-cover *c*. The said spindle is represented, for the purpose of combining lightness with stability, as made tubular and set firmly into or provided with a hollow head *e*, which has a flange 7, which is tightly set into and firmly attached to the interior of the cover. This head *e* is of a depth to project into the cover a distance about equal to, preferably not less than, the depth of the rim 6.

I prefer to make the spool *b* and have represented it as made with but one head, one only being necessary, as the spindle-head *e* takes the place of a second spool-head. The spool *b* represented is a simple metal tube fitted loosely to the spindle *d* and having a flange which forms a head at that end which is located farthest from the box-cover.

To provide for securing the spool to the spindle *d* and the box-cover, the hollow spindle is provided at one side of its unattached end with a lip or projection 8, which is bent laterally over the end of the spool.

The taking off of the cover from the body of the box withdraws the spool from the latter, the spool being retained on the spindle by the lip 8 of the latter, but being permitted to turn freely thereon. While the box-cover is then held firmly by one hand the outer end of the ribbon *g* may be freed by removing the pin *h*, commonly employed to fasten it, and the same pin or any other pin may be employed in the other hand to take hold of the said end and draw it from the spool, which then turns freely on the spindle. The edge of the ribbon next the box-cover is during the unwinding protected from any fraying action of the edge of the cover-rim 6 by the smooth face of the spindle-head *e* projecting even with or beyond the said edge, that being one purpose of said projecting head, another purpose of said head being to provide a stable attachment of the spindle to the cover without impairing the appearance of the exterior of the cover.

What I claim as my invention is—

1. In combination, a box having a movable cover, a spindle attached to the interior of said cover for the reception of a spool, and means for retaining the spool on said spindle while the cover, the spindle and the spool are removed from the box, substantially as herein described.

2. In combination, a box having a movable cover, and a tubular spool-spindle one end of which is attached permanently to said cover and the other end of which has a lateral projection for the retention of a spool and the withdrawal of the latter from the box along with the cover, substantially as herein described.

3. In combination, a box, a cover having a rim overlapping the body of the box, a spindle attached at one end to the interior of said cover and projecting therefrom directly into the box for the reception of a spool, and a head which surrounds said spindle and projects internally from the cover within said rim, substantially as herein described.

4. In combination, a box having a movable cover, a hollow head attached to and projecting within said cover and a hollow spindle attached at one end to the hollow head for the reception of a spool, substantially as herein described.

In testimony that I claim the foregoing as my invention I have signed my name, in presence of two witnesses, this 12th day of January, 1900.

EDGAR W. MERSEREAU.

Witnesses:
 FREDK. HAYNES,
 EDWARD VIESER.